(12) United States Patent
Krisiloff et al.

(10) Patent No.: US 11,954,571 B2
(45) Date of Patent: Apr. 9, 2024

(54) CHURN-AWARE MACHINE LEARNING FOR CYBERSECURITY THREAT DETECTION

(71) Applicant: Google LLC, Mountain View, CA (US)

(72) Inventors: David Benjamin Krisiloff, Arlington, VA (US); Scott Coull, Cary, NC (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/159,434

(22) Filed: Jan. 25, 2023

(65) Prior Publication Data
US 2023/0162095 A1  May 25, 2023

Related U.S. Application Data

(63) Continuation of application No. 16/842,568, filed on Apr. 7, 2020, now Pat. No. 11,568,316.

(51) Int. Cl.
*H04L 9/40*     (2022.01)
*G06N 20/00*   (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | | |
|---|---|---|---|---|
| 11,386,075 B2 * | 7/2022 | Schierz | ............ | G06Q 10/0635 |
| 2013/0198119 A1 * | 8/2013 | Eberhardt, III | ........ | G06N 20/00 706/12 |
| 2018/0159871 A1 * | 6/2018 | Komashinskiy | .... | H04L 63/1416 |
| 2020/0364338 A1 * | 11/2020 | Ducau | ................... | G06F 21/563 |
| 2020/0374316 A1 * | 11/2020 | Crabtree | ............. | H04L 63/1425 |
| 2021/0103580 A1 * | 4/2021 | Schierz | ............... | G06F 16/2365 |
| 2021/0273960 A1 * | 9/2021 | Humphrey | .......... | H04L 63/1425 |
| 2021/0385236 A1 * | 12/2021 | Abu-Nimeh | ........ | H04L 63/1416 |

OTHER PUBLICATIONS

D. Krisiloff, "Churning Out Machine Learning Models: Handling Changes in Model Predictions", Apr. 9, 2019, online at https://www.fireeye.com/blog/threat-research/2019/04/churning-out-machine-learning-models-handling-changes-in-model-predictions.html.
D. Sculley et al., "Machine Learning: The High Interest Credit Card of Technical Debt", SE4ML: Software Engineering for Machine Learning (NIPS 2014 Workshop).

(Continued)

*Primary Examiner* — Joseph P Hirl
*Assistant Examiner* — Hassan Saadoun
(74) *Attorney, Agent, or Firm* — Dority & Manning, P.A.

(57) ABSTRACT

Churn-aware training of a classifier which reduces the difference between predictions of two different models, such as a prior generation of a classification model and a subsequent generation. A second dataset of labelled data is scored on a prior generation of a classification model, wherein the prior generation was trained on a first dataset of labelled data. A subsequent generation of a classification model is trained with the second dataset of labelled data, wherein in training of the subsequent generation, weighting of at least some of the labelled data in the second dataset, such as labelled data threat yielded an incorrect classification, is adjusted based on the score of such labelled data in the prior generation.

19 Claims, 7 Drawing Sheets

(56) References Cited

OTHER PUBLICATIONS

Q. Cormier et al., "Launch and Iterate: Reducing Prediction Churn", Advances in Neural Information Processing Systems (NIPS) 29, 2016.
A. Gepperth et al., "Incremental learning algorithms and applications", European Symposium on Artificial Neural Networks (ESANN), 2016, Bruges, Belgium.
B. Frénay et al., "A Comprehensive Introduction to Label Noise", ESANN 2014 proceedings, European Symposium on Artificial Neural Networks, Computational Intelligence and Machine Learning. Bruges (Belgium), Apr. 23-25, 2014.
A. Cotter et al., "Optimization with Non-Differentiable Constraints with Applications to Fairness, Recall, Churn, and Other Goals", arxiv preprint 2018.
G. Goh et al. "Satisfying Real-world Goals with Dataset Constraints", 30th Conference on Neural Information Processing Systems (NIPS 2016).

* cited by examiner

CHURN-AWARE MACHINE LEARNING FOR CYBERSECURITY THREAT DETECTION

This application is a continuation of Application No. 16/842,568 filed Apr. 7, 2020, currently pending, the contents of all of which are incorporated herein by reference as if set forth in full.

FIELD

The present disclosure relates generally to machine learning and training of classification models such as malware classification models for AI-based cybersecurity systems.

BACKGROUND

Machine learning (including traditional machine learning and deep learning) is increasingly used in cybersecurity for detection and other purposes as well as in a variety of other technical fields such as health care, financial services, transportation, oil and gas, energy, and government. But despite advances in technology, the outputted result of machine learning models is not always correct. Thus, in many cases, the results of machine learning models are post-processed (and thereby refined), for example, to correct model outputs that are false negatives and/or false positives, for example, in cybersecurity detection, incorrectly missing malicious activity and (incorrectly alerting on benign activity, respectively. Such post-processing refinements on output may include blacklists, whitelists, external intelligence feeds or rule-based detection systems.

SUMMARY

For convenience in conveying an understanding of aspects, benefits and applications of the invention, the following description will refer to embodiments concerned with cyber-security. This approach to description shall not be understood to limit the generality of the invention as claimed.

When a machine learning model is updated (i.e., retrained), for instance to adapt to changes in attacker behavior (Tactics, Techniques and Procedures (TTPs)) and the cyber-threat landscape, the output of that model (e.g., probability of maliciousness and resulting classification of benign vs. malicious and resulting classification of maliciousness) may change significantly. Ideally, when the machine learning model is updated, the only change in model outputs should be improvements, e.g. fixes to previous errors (misclassifications).

As a practical matter, however, even if the overall accuracy of the model is increased as a result of retraining, individual changes in model output are not guaranteed to be improvements. In a particular example, retraining of the model or use of a newer model may introduce new false negatives or new false positives in the outputted results of the updated model. Downstream systems or processes (e.g., whitelist, blacklist, rule-based detection analysis, other ML models) may consume those results, often to verify those results or to perform further analyses. Alternatively, the machine learning classification model may be used to verify or perform further analysis on results from upstream systems and processes. In those cases those systems and processes may have been well-tuned to outputs of the prior generation of the model and may no longer be well-tuned to outputs of the retrained model. For example, in a case where a new false positive is introduced by the updated model, the former whitelist would no longer be well-tuned to the updated model, for the reason that a new entry would be needed to the whitelist to account for the new false positive.

Formally, prediction "churn" as used herein is defined as the expected difference (such as a percent difference) between predictions of two different models, such as a prior generation of a model and a subsequent generation. Note that "prediction churn" is not the same as "customer churn", which is defined as the loss of customers over time, and which is a more common usage of the term "churn" in the field of business analytics. In addition, "bad churn" when retraining a classifier is defined as the percentage of misclassified samples in the test set which the original model classified correctly.

According to one aspect described herein, churn in training a subsequent classification model is reduced with respect to a prior generation of a classification model, wherein the prior generation was trained on a first dataset of labelled data. According to this aspect, a second dataset of labelled data is scored on the prior generation of the classification model, wherein scoring of the second dataset may be a determination of the probability of maliciousness as determined by the prior generation of the classification model, wherein the prior generation was previously trained on the first dataset of labelled data. The second dataset of labelled data might include some of the labelled data in the first dataset together with labelled data not included in the first dataset, but this is not necessarily so. For example, there might not be a reason to include any of the first dataset if the first dataset is stale or incorrect, or if there is significant overlap between the first and second datasets. Conversely, the first dataset might be included for the general reason that in training, more data is generally better. A subsequent generation of the classification model is trained with the second dataset of labelled data, wherein in training of the subsequent generation, weighting of at least some of the labelled data in the second dataset is differentially adjusted based on the score of such labelled data in the prior generation.

According to this aspect, in training of the subsequent generation, the weighting of labelled data for incorrect classifications for the prior generation may be varied in accordance with distance of the incorrect classification from a classification boundary that defines a boundary for the prior generation between two or more classes, for example the boundary between a classification of malware and a classification of benign for the prior generation, such that the weighting decreases in accordance with increasing distance from the boundary. In some embodiments and use cases, the boundary may be linear or nonlinear, and in general the shape of the boundary is determined by the choice of machine learning algorithm.

The subsequent generation of the classification model may be either the generation immediately subsequent to the prior generation, or a more remote generation not immediately subsequent to the prior generation. In addition, in training of the subsequent generation, data weights are differentially adjusted such that weighting of labelled data for incorrect classifications may be reduced compared to the weighting of correct classifications. Differential weighting includes but is not limited to the notions of increasing the weight of correct classifications while reducing the weight of incorrect classifications, reducing the weight of incorrect classifications without adjusting the weight of correct classifications, and applying different weighting algorithms to determine weights individually based on whether the classification is correct or incorrect.

In addition, an ensemble of previous models may be used instead of just the one prior model. For example, using all or multiple previous models, the distances to the decision boundaries may be computed, and then averaged or otherwise combined to determine weightings, such as by giving more importance to the distances in more recent generations of models as compared to more remote generations of models.

Still further according to this aspect, the prior generation of the classification model may provide a numeric probability that a given item of labelled data is malicious, wherein in training of the subsequent generation, the weighting of labelled data for incorrect classifications for the prior generation varies in accordance with a difference in the probability from a select fractional number between zero (0.0) and one (1.0), such that the weighting decreases in accordance with increasing difference from that fractional number. For example, the weighting may be varied according to the following relationship:

$$w_i = \alpha - \beta |\delta - P_{old}(X_i)|$$

where $w_i$ is the weight applied for a given item $X_i$ in the second dataset, $\alpha$ and $\beta$ are adjustable hyperparameters, $\delta$ is a parameter relating to the classification threshold such as $\delta = 0.5$, $P_{old}(X_i)$ is the numeric probability provided by the prior generation of the classification model for an incorrect classification of the given item $X_i$ in the second dataset, and "||" is an absolute value operator. Hyperparameter $\alpha$ and $\beta$ may be selected so as to reduce the resulting weight $w_i$ as the numeric probability $P_{old}(X_i)$ moves farther from the classification boundary.

DESCRIPTION OF THE DRAWINGS

FIGS. 4A and 4B are block diagrams depicting an example malware detection system, wherein FIG. 4A depicts an example using a prior generation of a malware classification engine and FIG. 4B depicts an example using a subsequent generation of a malware classification engine.

DETAILED DESCRIPTION

Ideally, when a model is updated, the only change in model outputs are improvements, e.g. fixes to previous errors. Both false negatives (failure to alert on malicious objects) and false positives (incorrectly alerting on benign objects), have significant impact and should be minimized. Nevertheless, since it is expected that any model will still have false positive or false negative errors, such errors are typically mitigated with orthogonal approaches that apply post-processing to the output of the model. Such approaches might include: whitelists and blacklists, external intelligence feeds, rule-based systems, and so forth. Combining with other information also provides context for that may not otherwise be present.

When the model is updated, however, these systems can sometimes suffer unintended side effects. For example, even when the overall model accuracy has increased, individual changes in model output are not guaranteed to be improvements. Introduction of new false negatives or new false positives in an updated model, called "churn", creates the potential for new vulnerabilities and negative interactions with cyber security infrastructure that consumes output of the model.

According to the disclosure herein, when retraining a cyber security-focused model, it may be beneficial to calculate and to control for churn, as defined above. For cyber security applications, it is sometimes enough to focus on just those differences where the newer model performs worse than the older model. This is herein referred to as "bad churn" as defined above.

Figure 1A:
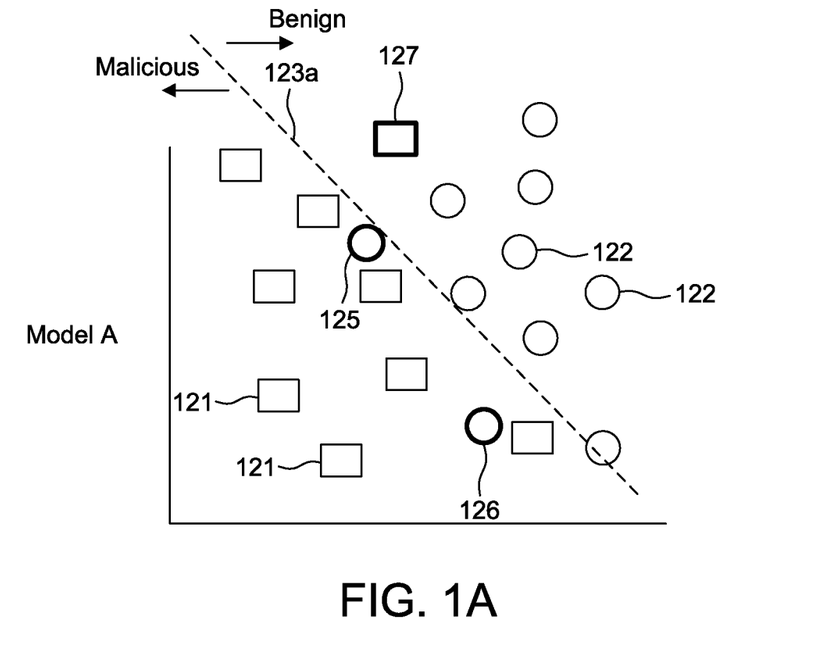
FIGS. 1A and 1B are views for explaining prediction churn.
Figure 1B:
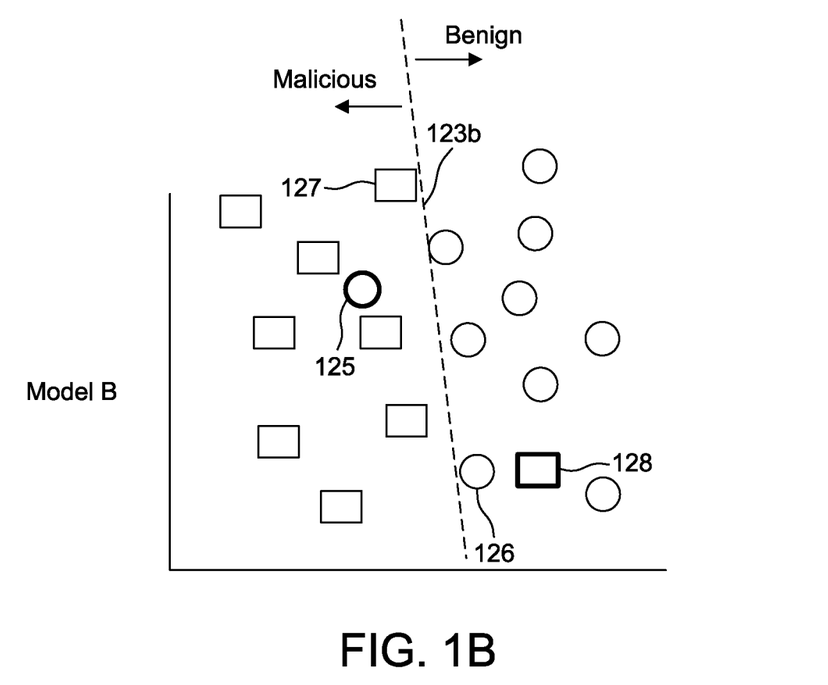

Churn is often a surprising and non-intuitive concept, given that accuracy of the newer model is usually better than the accuracy of the older model. FIGS. 1A and 1B are views for explaining how churn can arise.

FIGS. 1A and 1B depict a "toy" example of a simple linear classification problem in which malicious squares 121 are classified relative to benign circles 122, with Models A and B both shown in operation on the same dataset. The boundary between malicious and benign is depicted at 123a for Model A and at 123b for Model B, and in this example the shape of the boundary is linear. The original model, Model A, makes three misclassifications as indicated with thick borders on circles 125 and 126 which are incorrectly classified as malicious, and on square 127 which is incorrectly classified as benign. The newer model, Model B, makes only two errors, as shown with thick borders on circle 125 and square 128. Model B is thus the more accurate model. Note, however, that Model B, while retaining the error at circle 125, and correcting the error at circle 126 and square 127, introduces a new mistake at square 128, misclassifying a square as benign. Such square 128 was correctly classified as malicious by model A, and represents an instance of bad churn. As such, it is shown as possible to reduce the overall error rate while introducing a small number of new errors which did not exist in the older model.

Practically, churn introduces at least two problems associated with the models. First, bad churn may require changes to post-processing systems and procedures, such as modifications to whitelist/blacklists used in conjunction with the models. As we previously discussed, these are used to handle the small but inevitable number of incorrect classifications. Testing on large repositories of data is necessary to catch such changes and update associated whitelists and blacklists, thus compounding the problem.

Second, churn may create issues for other models or rule-based systems which rely on the output of the model. For example, consider a hypothetical system which evaluates URLs for cyber-risk using both a model and a noisy blacklist. The system generates an alert if P(URL='malicious')>0.9 or
P(URL='malicious')>0.5 and the URL is on the blacklist Thus, this system generates an alert if the model predicts a high probability (greater than 0.9) of the URL being malicious, and also generates an alert even if the probability is not so high (greater than only 0.5 rather than 0.9) if the URL is on the blacklist.

After retraining, the distribution of P(URL='malicious') changes and all .com domains receive a higher score. The alert rules may need to be readjusted to maintain the required overall accuracy of the combined system. Ultimately, finding ways of reducing churn minimizes this kind of technical debt.

Figure 2A:
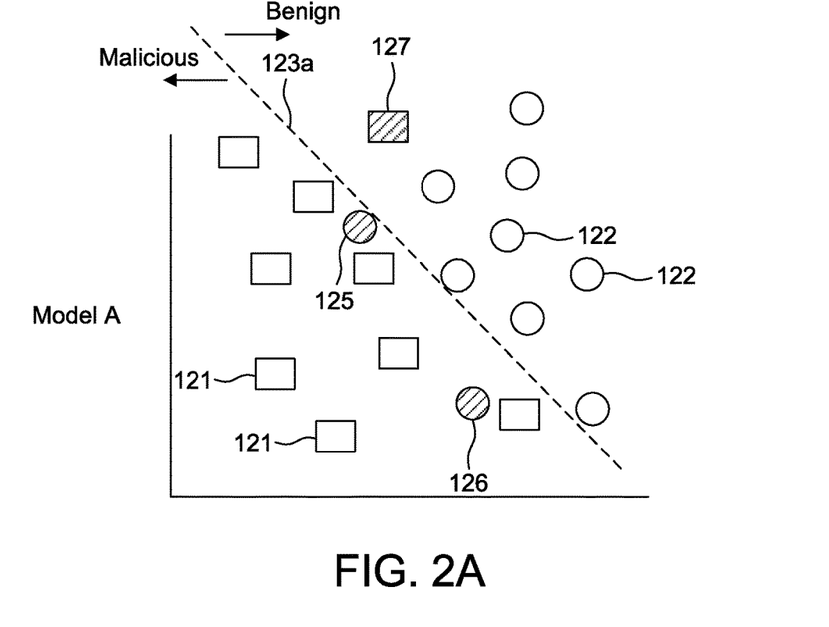
FIG. 2A is a view for explaining a reduction in weights for incorrect classifications.
Figure 2B:
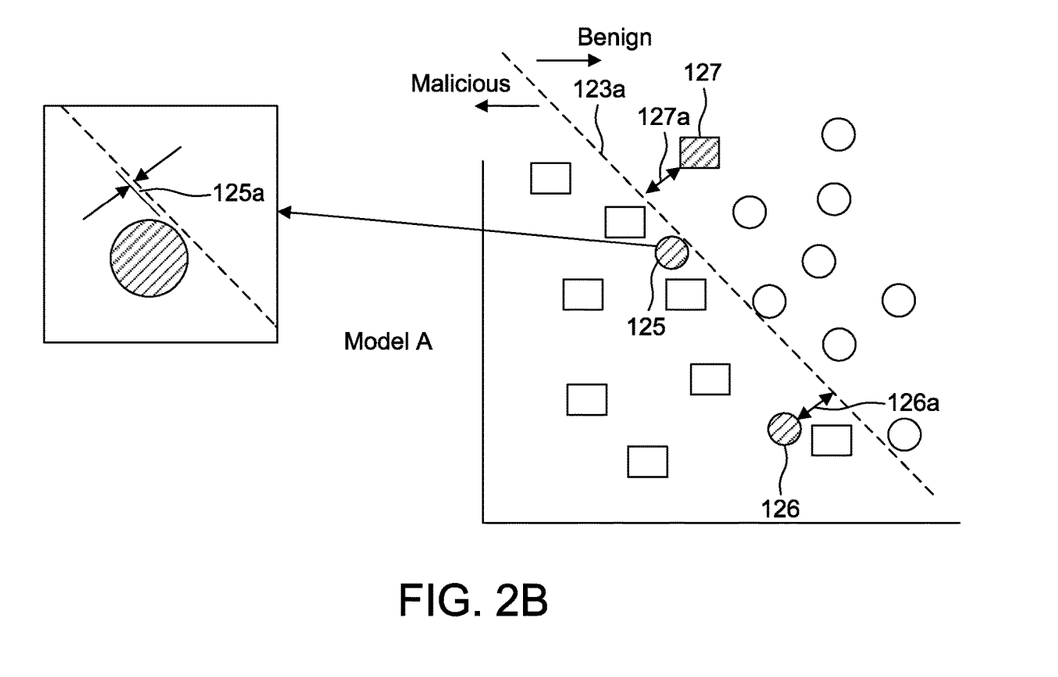
FIG. 2B is a view for explaining the amount of reduction relative to a classification boundary.

FIGS. 2A and 2B are views for explaining one embodiment for the reduction of churn according to the disclosure herein. As previously noted, these figures show a "toy" example with a simple linear boundary. It is to be understood that in most real-world embodiments, the boundary is decidedly non-linear, and in general the shape of the boundary is determined by the choice of machine learning algorithm.

In these figures, churn is reduced by retraining in which weights used in retraining are reduced for incorrect classifications, wherein the amount of reduction is calculated relative to a distance from a classification boundary.

In more detail, FIG. 2A depicts Model A with the same boundary 123a as shown in FIG. 1, for the same dataset as FIG. 1. Correct classifications are shown at 121 and 122, and incorrect classifications are shown at 125, 126 and 127 with cross-hatching for emphasis.

In FIG. 2B, incorrect classifications are scored in accordance with distance from boundary 123a. One purpose of scoring is to reduce the importance of previous model errors when training the new model. Intuitively, in consideration of reducing churn and reducing the impact on post-processing, if the new model makes a mistake it is considered to be better if the mistake is the same mistake as was made in the prior model.

Thus, in FIG. 2B, incorrectly classified circle 125 is weighted as relatively high, given that its distance 125a from boundary 123a is relatively small. There is thus a real possibility that in retraining Model A, it is possible to find a new boundary in the newer Model B where circle 125 is correctly classified as a benign circle, as opposed to Model A's incorrect classification as a malicious square.

On the other hand, incorrectly classified rectangle 127 is weighted as relatively low, given that its distance 127a from boundary 123a is relatively large. It is thus unlikely that in retraining Model A, it is possible to find a new boundary in the newer Model B where rectangle 127 is correctly classified as a malicious square as opposed to Model A's incorrect classification as a benign circle.

In this embodiment, weights of the samples in the dataset are adjusted based on the scoring. In particular, weighting of data in the dataset for incorrect classifications for the prior generation of the model varies in accordance with distance of the incorrect classification from a classification boundary that defines a boundary between classifications, here, a boundary between a classification of malware and a classification of benign for the prior generation, such that the weighting decreases in accordance with increasing distance from the boundary. In this "toy" example, the boundary is linear but more generally and in actual practice the boundary is often not linear. Generally speaking, the more wrong things were in the prior generation, the less important they become in training the newer generation. This corresponds to retraining in which the newer model is prevented from making very large changes which potentially would also create significant churn.

In this example, weights of incorrect classifications are reduced and those of correct classifications are not adjusted. In other embodiments, there may be a differential weighting, where labelled data for incorrect classifications and correct classifications are weighted differentially in accordance with score, such as by increasing the weight of correct classifications while reducing the weight of incorrect classifications, or by applying different weighting algorithms (or different parameters in Equation (1), below) based on whether the classification is correct or incorrect, thereby to result in differential weighting.

In scoring of labelled data where the model provides a numeric probability that a given item of labelled data is malicious, weighting of labelled data for incorrect classifications for the prior generation may vary in accordance with a difference in the probability from a fractional number between zero (0.0) and one (1.0), such that the weighting decreases in accordance with increasing difference from the fractional number. More particularly, the weighting may vary according to the following relationship:

$$w_i = \alpha - \beta|\delta - P_{old}(X_i)| \qquad \text{Equation(1)}$$

where $w_i$ is the weight applied for a given item $X_i$ in the second dataset, $\alpha$ and $\beta$ are adjustable hyperparameters, $\delta$ is a parameter relating to the classification threshold such as $\delta=0.5$, $P_{old}(X_i)$ is the numeric probability provided by the prior generation of the malware classification model for an incorrect classification of the given item $X_i$ in the second dataset, and "||" is an absolute value operator. Hyperparameter $\alpha$ and $\beta$ may be selected so as to reduce the resulting weight was the numeric probability $P_{old}(X_i)$ moves farther from the classification boundary. Similarly, in some embodiments, a non-linear higher-order, weighting function may be used. In some embodiments the retraining may be repeated using alternative weighting functions and the retrained model associated with least misclassifications is selected.

The foregoing Equation (1) expresses the general notion that the farther away from the boundary, the more certain the classifier is about the classification. As an example, assume that the score represents a probability P of maliciousness. Then, high-score examples here (P(malicious)>0.5)) would be labelled as malicious, and low-scoring examples will be benign. A benign example with P(malicious)=0.01 is very far away from the decision boundary because the classifier is very sure that the label is correct. Likewise, a malicious example with P(malicious)=0.99 is also very far away from the boundary for the same reason. However, a benign example with P(malicious)=0.49 or a malicious example with P(malicious)=0.51 are very close to the boundary, and therefore the classifier is not certain.

One point of this approach is to leverage this knowledge so that there is little point in pursuing a retraining correction on items for which the classifier is extremely certain about and focus attention primarily on fixing the examples that the classifier is uncertain about, because these examples are easier to fix and result in modest changes to the decision boundary, thereby minimizing churn.

With respect to the shape of the boundary, the general shape of the boundary is determined by the type of machine learning model used. Linear models, nearest-neighbors, random forests, deep neural networks—they all will exhibit different boundary shapes. The disclosure herein is independent of the actual shape of the boundary. One aspect of the disclosure herein is that the distance to the boundary is used a factor in weighting during retraining. In this embodiment, distance to the boundary is defined based on the scored output by the model.

In this regard, as those of ordinary skill will recognize, a "classification threshold" is generally regarded as a number between 0 and 1 such that if the classifier predicts a probability, P(ClassA), greater than the classification threshold then the classifier assigns the label of "ClassA". In the field of cybersecurity, for example, given sample A, if the probability P(malicious)> the classification threshold (such as a threshold of 0.5) for sample A, then the classifier assigns the label of "malicious" to sample A.

Figure 3:
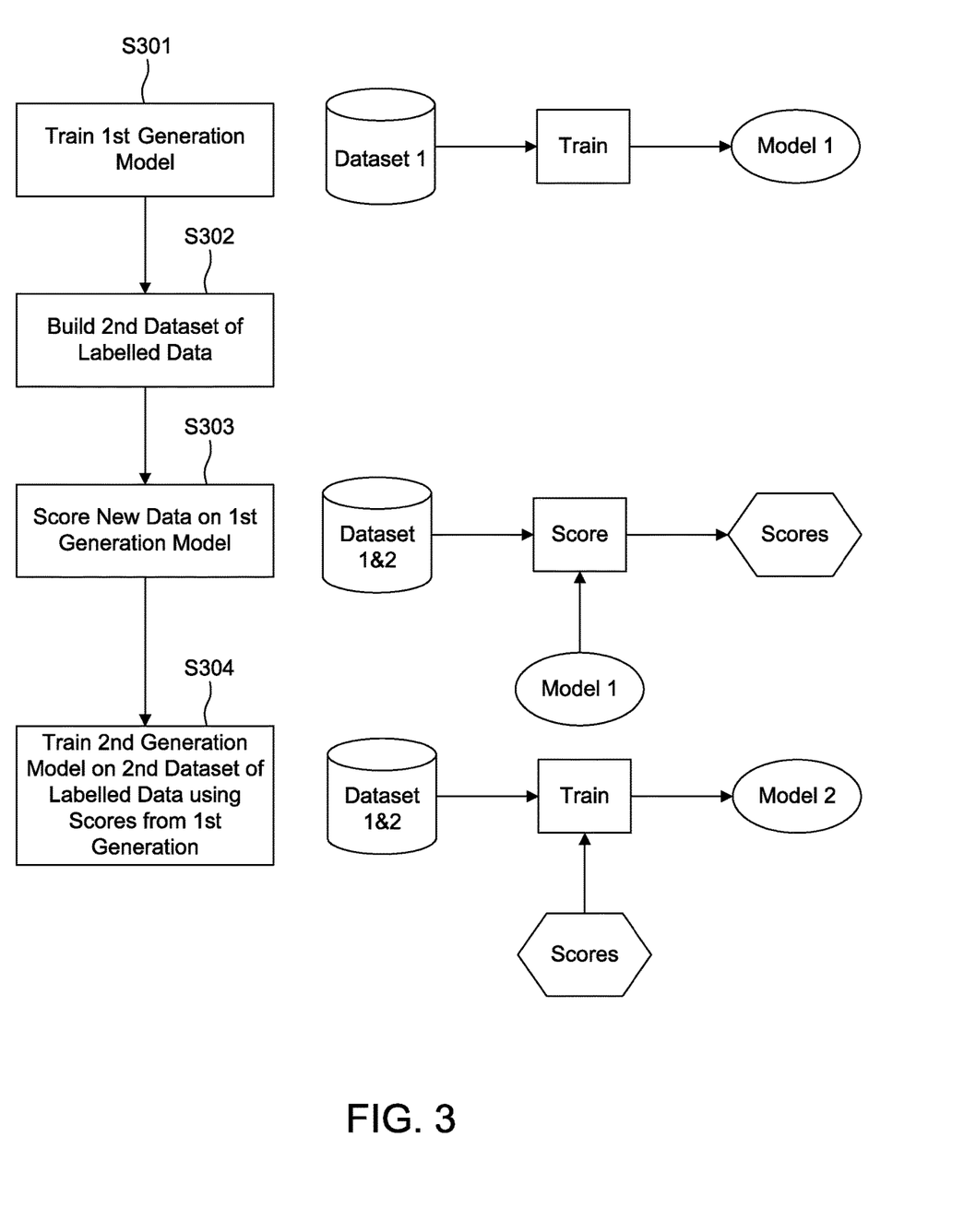
FIG. 3 is a flowchart showing training of a subsequent generation of a classification model based on incorrect classifications for a prior generation of a classification model.

FIG. 3 is a flowchart showing churn-aware training of a subsequent generation of a classification model based on incorrect classifications for a prior generation of a classification model. In brief, according to the process shown in FIG. 3, churn in training a malware classification model is reduced with respect to a prior generation of a malware classification model, wherein the prior generation was trained on a first dataset of labelled data. A second dataset of labelled data, which may be accrued (or generated based on a selection of verified labelled data) during deployment of the prior generation of the model, is scored on the prior generation of the malware classification model, it being understood that the prior generation was trained on a first dataset of labelled data. The second dataset of labelled data might include some of the labelled data in the first dataset together with labelled data not included in the first dataset, but this is not necessarily so. For example, there might not be a reason to include any of the first dataset if the first dataset is stale or incorrect, or if there is significant overlap between the first and second datasets. Conversely, the first dataset might be included for the general reason that in training, more data is generally better. The subsequent generation of the malware classification model is trained with the second dataset of labelled data, wherein in training of the subsequent generation, weighting of at least some of the labelled data in the second dataset is adjusted based on the score of such labelled data in the prior generation.

More specifically, at step S301, a first generation of the malware classification model is trained using a first dataset of labelled data. Training in this example results in Model 1 trained on dataset 1. Model 1 is thereafter deployed in the field, for malware detection.

At step S302, a second dataset of labelled data is built. The second dataset may, for example, be accrued from classification made by Model 1 during deployment, and it might also be built from other sources such as on-going monitoring of threats in the wild. As a result, data in dataset 2 includes labelled data not included in the first dataset.

At step S303, new data is scored against the prior generation of the malware classification model, which in this case is Model 1. The new data includes labelled data from the second dataset as well as data from the first dataset. In this embodiment, all data from both of datasets 1 and 2 is used, although it is not essential that all data from all datasets is used.

In step S304, a subsequent generation of malware classification model is trained, using the data in the new dataset based on scoring of the new dataset as against the prior generation of malware classification model. In this embodiment, the subsequent generation of malware classification model is an immediately subsequent generation, as depicted at Model 2, but in other embodiments the subsequent generation might be more remote.

System

Figure 4A:
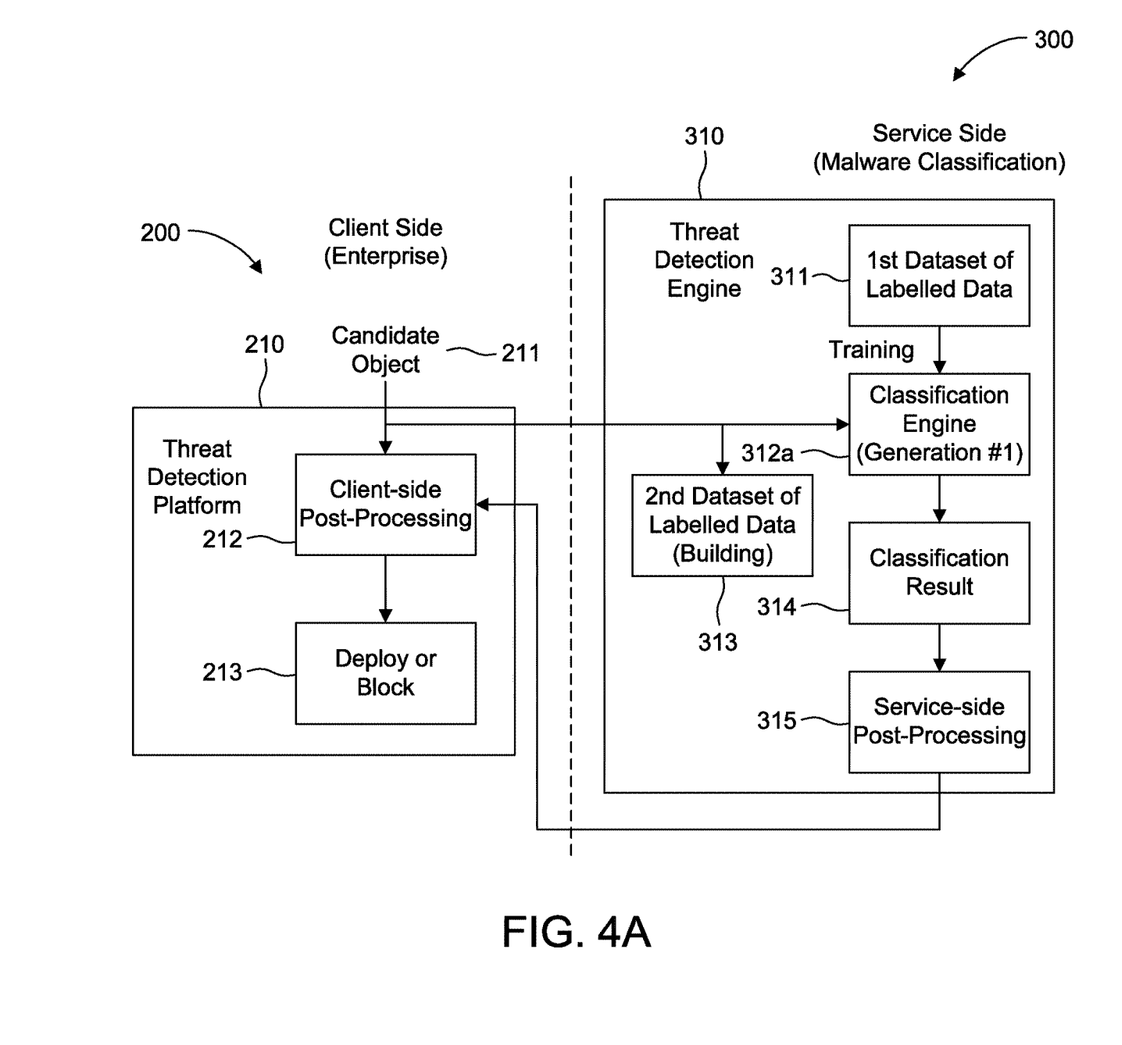
Figure 4B:
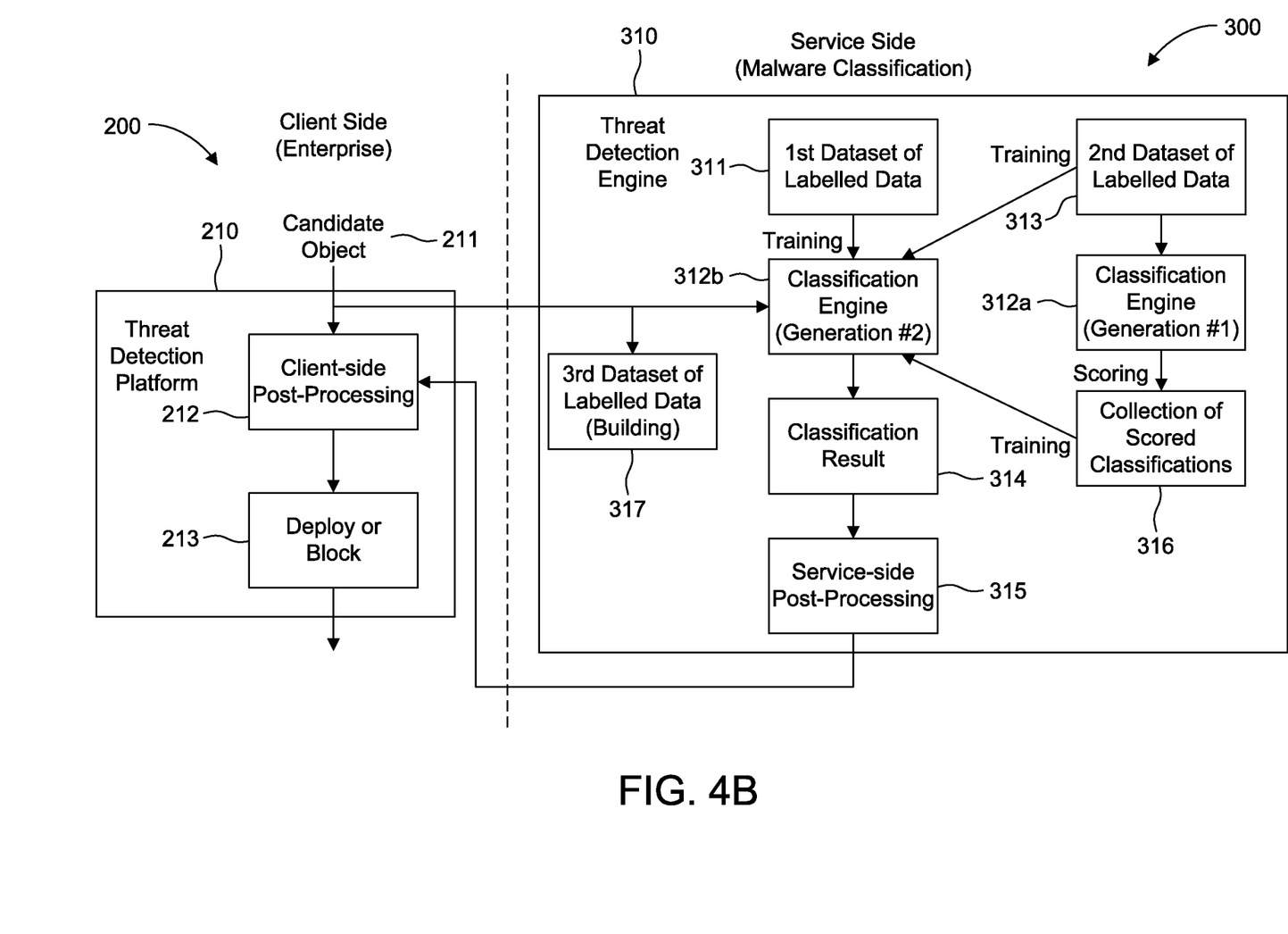

FIGS. 4A and 4B are block diagrams depicting an example malware detection system, wherein FIG. 4A depicts an example of training and deployment of a prior generation of a malware classification engine such as shown in steps S301 and S302, and wherein FIG. 4B depicts an example using a subsequent generation of a malware classification engine such as shown in steps S303 and S304.

As depicted in these figures, a malware detection system includes a client side 200 and a service side 300. The client side is typically embodied as an enterprise-level deployment with firewalls and the like (not shown), including a threat detection platform 210. There are typically multiple clients—usually tens of thousands—but these figures depict only one for purposes of clarity in explanation. The service side 300 is typically embodied in a cloud computing environment, and includes a threat detection engine 310 providing malware classification services to multiple clients concurrently. In other embodiments, threat detection platform 210 of client side 200, and threat detection engine 310 of service side 300, may either or both be implemented in enterprise level deployments or cloud computing environments.

FIG. 4A depicts threat detection engine 310 before retraining. As shown there, a candidate object 211 is provided by the client side to threat detection platform 210 for evaluation as either benign or malicious. Candidate object 211 may be a portable executable, a URL, a script (e.g., JavaScript, etc.) or any candidate for which an evaluation of maliciousness is sought. Threat detection platform 210, through interfaces described below, provides candidate object 211 (or other data package such as features extracted from the candidate object by the threat detection platform) to classification engine 312a in threat detection engine 310 on the service side, for evaluation.

Classification engine 312a has been trained previously on a first dataset of labelled data 311. In other embodiments, classification engine 312a might be the result of a retraining, with scored data from a previous generation or generations of the classification engine, as described herein.

Meanwhile, the candidate object 211 is also provided to a second dataset 313 for accumulation of data not already included in first dataset 311. In labelling the object, the labelling may be verified before inclusion in the second dataset. Verification may be the result of threat intelligence, alternative machine learning, expert knowledge or the like. The second dataset 313 thus accumulates new examples of possibly malicious data, which are thereafter labelled for use in a subsequent generation of classification engine 312a.

Classification engine 312a evaluates the candidate object 211 and provides a classification result 314, which may be a binary malware/goodware decision, a cyber-security risk assessment such as a numeric probability, and so forth. The classification result may be subjected to post-processing on the service side at 315, which refines the output of the classification result such as by applying blacklists, whitelists, external intelligence feeds, rule-based detection, and so forth. In this embodiment, the post-processed result is provided back to threat detection platform 210. In other embodiments, a decision on remediation and/mitigation of the cyber-risk (e.g., deployment or blocking of malware) may be made at the service side 300, and resulting actions in accordance with the decision presented (e.g., via a suitable message, display or other alert) to a security analyst or initiated automatically.

On receipt of the result from the service side 300, threat detection platform 210 on the client side 200 may also refine the result in its own post-processing at 212, such as by applying blacklists, whitelists, external intelligence feeds, rule-based detection systems, and so forth to the candidate object 211. The post-processed result is provided at decision block 213, which decides on a remediation or mitigation action, e.g., whether to deploy the candidate object 211 or to block processing of the candidate object 211 as malicious.

Post-processing in this embodiment is shown on both the client side (via client side post-processing 212) and on the service side (via service side post-processing 315), but in other embodiments post-processing might be used only on one side or the other.

FIG. 4B depicts the service side 300 after retraining based on scored data and based on the accumulated data in second labelled dataset 313, wherein such data was labelled and accumulated during deployment of first generation classification engine 312a.

As depicted in FIG. 4B, the second dataset 313 is scored by evaluating the second data set using the first generation classification engine 312a. Although not depicted explicitly, the first dataset 311 may be included in the scoring of the second dataset 313. As a result of scoring, a collection 316 of scored classifications is stored for use in training a subsequent generation of the classification engine. In this example, the subsequent generation is an immediately subsequent generation, but in other embodiments the generation may be more remote. Moreover, the collection 316 may be used in training multiple subsequent generations, or the collection from multiple prior generations may be used to train a subsequent generation, and results of the training can be compared for optimization in accuracy of the classification.

Then, as explained above such as in connection with the flowchart of FIG. 3, a second generation of classification engine 312b is trained by using the second dataset 313 of labelled data, inclusive in some embodiments of the first dataset 311 of labelled data, wherein in training of classification engine 312b, weighting of at least some of the labelled data is adjusted based on the score of such labelled data in the prior generation.

In operation, once the second generation of classification engine 312b is deployed, processing proceeds as described above for FIG. 4A, with newly-arriving candidate objects 211 being accumulated at the third dataset 317 of labelled data, possibly verified as mentioned above, for use in training of yet another subsequent generation of the classification engine.

Figure 5A:
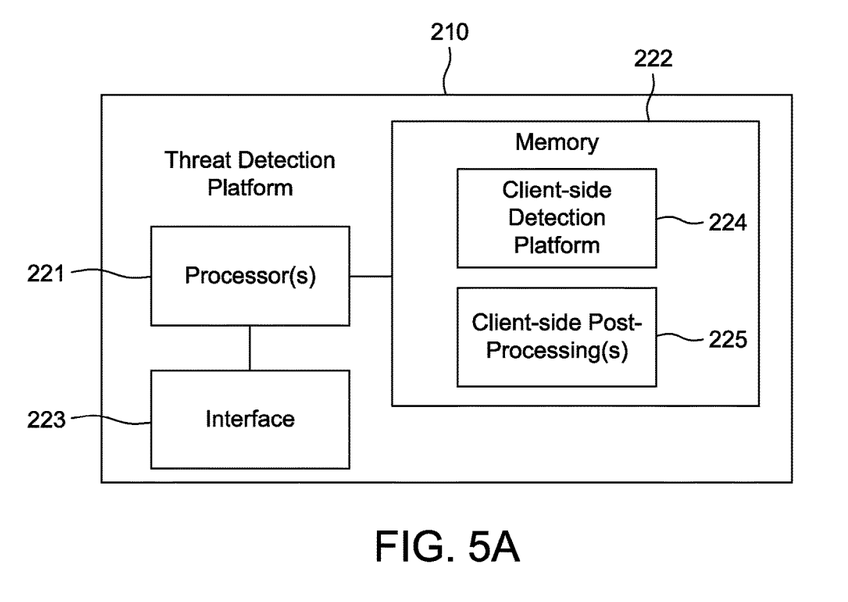
FIG. 5A is a block diagram of a threat detection platform on a client side of a malware detection system.
Figure 5B:
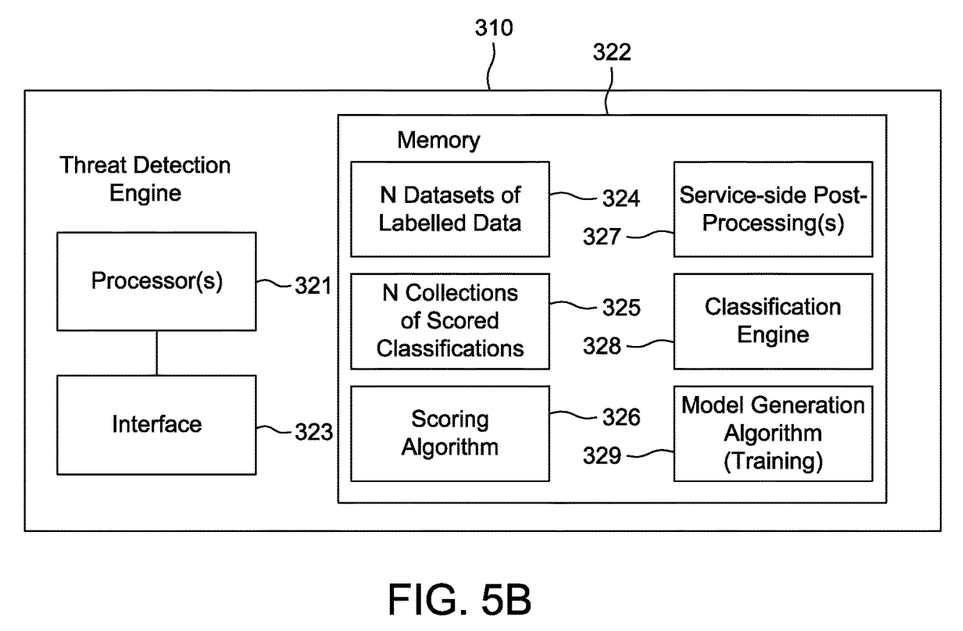
FIG. 5B is a block diagram of a threat detection engine on a service side of a malware detection system.

FIG. 5A is a block diagram of a threat detection platform on a client side of a malware detection system, which is usually an enterprise system, and FIG. 5B is a block diagram of a threat detection engine on a service side, usually a cloud-based system, of the malware detection system depicted in FIGS. 4A and 4B.

On the client side depicted in FIG. 5A, threat detection platform 210 includes one or more processors 221 constructed to execute computer-executable instructions stored in one or more memories 222, and further includes interface 223 for communication with threat detection engine 310 on the service side. Memory 222 stores computer-executable instructions for implementation by processor(s) 221 of the client side threat detection platform 210, inclusive of instructions 224 for carrying out detection of cyber-risks by the client side threat detection platform 210 such as execution of the machine learning model against candidate objects, and instructions 225 for the client side post-processing 212.

On the service side depicted in FIG. 5B, threat detection engine 310 includes one or more processors 321 constructed to execute computer-executable instructions stored in one or more memories 322, and further includes interface 323 for communication with threat detection platform 210 on the client side. Memory 322 stores data for multiple dataset 324 such as first, second and third datasets 311, 313 and 317; data for plural generations of classification engines; and further stores multiple collections 325 of scored datasets such as scored collection 316. Memory 322 also stores computer-executable instructions for implementation by processor(s) 321 of the service side threat detection engine 310, inclusive of instructions for plural machine learning models like models 312a and 312b, instructions 326 for a scoring m, instructions 327 for service-side post-processing 315, instructions 328 for classification engines 312a and/or 312b, and instructions 329 for ML training and retraining algorithms for use in generation of the classification models.

Experimental Results

Embodiments described herein were applied using EMBER, an "open source" (publicly available) malware classification data set, to test and demonstrate churn and churn reduction techniques. EMBER consists of 1.1 million portable executable files (PE files) first seen in 2017, along with their labels and features. The objective is to classify the files as either goodware (benign) or malware. Two models were generated in order to calculate the churn between models. As a consequence, to generate the models, the EMBER dataset was split into three pieces to simulate training of a first generation model, then retraining to obtain a second generation model, while keeping an independent data set for final evaluation. More specifically, the EMBER dataset was split as follows:

1: Training data—January through August which is used as the first dataset for training of the first-generation model.

2: Test 1 data—September and October which are used to simulate running the model in production during deployment, and thus correspond to building of the second dataset used in scoring and retraining so as to generate the subsequent generation model.

3: Test 2 data—November and December which are used to evaluate churn and accuracy of the first and second models from step 1 and 2.

For purposes of comparison, a LightGBM classifier composed of 1,000 decision trees was built and trained on the training data, which is referred to as the "baseline model". To simulate production, the baseline model was run on Test 1 data and false positives (FPs) and false negative (FNs) were recorded. The model is thereafter retrained using both the training data and the FPs/FNs from Test 1 data, which is herein referred to as the "standard retrain" for comparison purposes. It was believed that this was a reasonably realistic simulation of actual production data collection and model retraining. Both the baseline model and the standard retrain were evaluated for accuracy and churn on Test 2 data (discussed below).

As a further comparison, the baseline model was retrained using so-called "incremental learning". In general, in incremental learning, new data is used to learn new concepts without forgetting (all) previously learned concepts. That also suggests that an incrementally trained model may not have as much churn, as the concepts learned in the baseline model (and, often, the resulting errors) still exist in the new model. Not all machine learning models (ML models) support incremental learning, but linear and logistic regression, neural networks, and some decision trees do. Other ML models can be modified to implement incremental learning.

Incremental approaches only work if the features of the original and new model are identical. If new features are added, say to improve model accuracy, then alternative methods are required. If what both accuracy and low churn are desired, then the most straightforward solution is to include both of these requirements when training. Although this approach has been considered, by applying different weights to samples during training in such a way as to minimize churn, such approaches inevitably lead to increased complexity such as a doubling of the dataset size which also requires a doubling of memory requirements and an increase in compute time.

Nevertheless, for purposes of comparison, and despite the increase in complexity of training and retraining, the baseline LightGBM model was incrementally retrained in accordance with an embodiment of the invention by augmenting the training data with FPs and FNs from Test 1 data and then trained an additional 100 trees on top of the baseline model (for a total of 1,100 trees). Unlike the baseline model a regularization (L2 parameter of 1.0) was used; using no regularization resulted in overfitting to the new points.

Against these comparisons, the baseline model was retrained using the described embodiments, referred to herein as reduced churn operator model (RCOP). Practically, because of scoring and weighting, the model sees making the same mistakes in a subsequent generation of the model as mistakes made in a prior generation of the model as being cheaper than making a new mistake. In this example, the weighing scheme gives all samples correctly classified by the original model a weight of one (1.0) and all other samples have a weight shown in above Equation (1). The same training data as the incremental model was used. The following numeric values for Equation (1) were used for weighting incorrect samples for RCOP: $\alpha=0.9$, $\beta=0.6$, $\delta=0.5$.

Table 1 summarizes each of these approaches, discussed in detail above.

TABLE 1

A description of the models tested

| Name | Trained on | Method | Total # of trees |
|---|---|---|---|
| Baseline | train | LightGBM | 1000 |
| Standard retrain | train + FPs/FNs from baseline on Test 1 data | LightGBM | 1100 |
| Incremental model | train + FPs/FNs from baseline on Test 1 data | Trained 100 new trees, starting from the baseline model | 1100 |
| RCOP | train + FPs/FNs from baseline on Test 1 data | LightGBM with altered sample weights: $\alpha = 0.9$, $\beta = 0.6$, $\delta = 0.5$ | 1100 |

Figure 6:
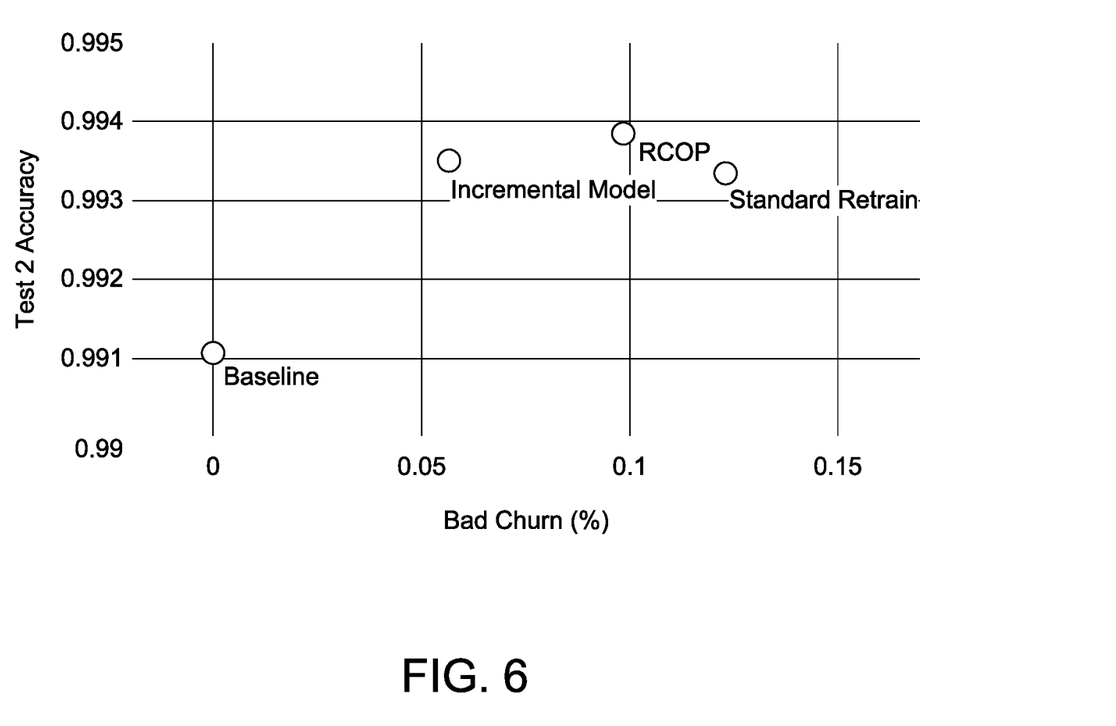
FIG. 6 is a table showing accuracy and churn percentages for an example embodiment as compared against comparison examples.

Results are shown in FIG. 6, which shows accuracy and churn percentage for the baseline model, for the standard retrain, for incremental retraining, and for the RCOP retraining.

The standard retrain has a higher accuracy than the baseline on Test 2 data, 99.33% vs 99.10% respectively. However, there are 246 misclassifications made by the retrain model that were not made by the baseline, which results in a figure of 0.12% bad churn.

The incremental model has a bad churn of 0.05% (113 samples total) and 99.34% accuracy on Test 2 data. Another interesting metric is the model's performance on the new training data, namely, the number of baseline FPs and FNs from Test 1 data that the incrementally trained model fixes. The incrementally trained model correctly classifies 84% of the previous incorrect classifications. In a very broad sense, incrementally training on a previous model's mistake provides a "patch" for the "bugs" of the old model.

In comparison, according to the example embodiment using the reduced churn operator model (RCOP), the RCOP produces produces 0.09% bad churn, 99.38% accuracy on Test 2 data.

The baseline model has 100 fewer trees than the other models, which could explain the comparatively reduced accuracy. However, even increasing the number of trees resulted in only a minor increase in accuracy of <0.001%. The increase in accuracy for the non-baseline methods is due to the differences in data set and training methods. Both incremental training and RCOP work as expected producing less churn than the standard retrain, while showing accuracy improvements over the baseline. In general, there is usually a trend of increasing accuracy being correlated with increasing bad churn. The increase in accuracy is thought to occur due to changes in the decision boundary, such that the more improvement in accuracy results in more changes. It seems reasonable the increasing decision boundary changes correlate with an increase in bad churn although there is currently no good theoretical justification for why that must always be the case.

Unexpectedly, both the incremental model and RCOP produce more accurate models with less churn than the standard retrain. It might have been assumed that given their additional constraints, both models would have less accuracy with less churn. The most direct comparison is RCOP versus the standard retrain. Both models use identical data sets and model parameters, varying only by the weights associated with each sample. RCOP reduces the weight of incorrectly classified samples by the baseline model. That reduction is responsible for the improvement in accuracy. A possible explanation of this behavior is mislabelled training data. Multiple authors have suggested identifying and removing points with label noise, often using the misclassifications of a previously trained model to identify those noisy points. RCOP, which reduces the weight of those points instead of removing them, is an improvement over those other noise reduction approaches which could explain the accuracy improvement.

Overall, while the incremental model has a somewhat better figure for bad churn, it has a worse figure for accuracy. On the whole, the example RCOP model produces better overall results when considering both churn and accuracy, and when considering the computational disadvantages of the incremental model in terms of a doubling of the dataset size, a doubling of memory requirements and an increase in compute time.

The embodiments illustrated and discussed in this specification are intended only to teach those skilled in the art how to make and use the disclosure herein. In describing embodiments of the disclosure herein, specific terminology is employed for the sake of clarity. However, the disclosure herein is not intended to be limited to the specific terminology so selected. For example, embodiments of the invention can be employed in areas of cybersecurity beyond classification for threat detection, such as, for example, correlating threat actor behavior (e.g., based on collections of TTP of known threat actors) for purposes of threat attribution, assessing and managing cyber-threats to an organization (e.g., based on collections of real-time network and network device performance and operation data), etc. Still other embodiments may be used in a great variety of other technical fields and industries, such as health care, financial services, transportation, oil and gas, energy, government and a variety of others in which extracting accurate predictions and insights from collected data is desirable.

Moreover, although a binary classifier is described in connection with malware and cybersecurity, it is to be understood that multiclass classifiers are also within the scope of the teachings herein. As one example, a multiclass classifier can be implemented as a battery of binary classifiers and the teachings applied herein without modification. For other multiclass classifiers, the weightings are applied as a function of distance from the boundary, such that the weight applied in training is increasingly attenuated as the distance from the boundary increases. As one example, the distance to the decision boundary may be computed as the difference between the two highest scoring classes.

The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. A method for training a classification model in the presence of label noise, the method comprising:
    scoring a second dataset of labelled data on a prior generation of a classification model, wherein the prior generation was trained on a first dataset of labelled data;
    training a subsequent generation of a classification model with the second dataset of labelled data, wherein the second dataset of labelled data includes label noise whereby at least some of the labelled data is labelled incorrectly;
    wherein in training of the subsequent generation, weighting of at least some of the labelled data in the second dataset is adjusted based on the score of such labelled data in the prior generation;
    wherein a score for a given item of labelled data in the second dataset indicates a probability that the given item does or does not belong to a first classification, and wherein in assigning a weight, an item with a higher probability of belonging or not belonging to the first classification is assigned a weight lower than an item with a lower probability of belonging or not belonging to the first classification; and
    providing the subsequent generation of a classification model as an update for a machine learning system for purposes of classification, correlation or prediction.

2. The method of claim 1, wherein by assigning a weight such that an item with a higher probability of belonging or not belonging to the first classification is assigned a weight lower than an item with a lower probability of belonging or not belonging to the first classification, at least some of the incorrectly labelled data in the second dataset is assigned a low weight, whereby training with the incorrectly labelled data has little effect on training of the subsequent generation of a classification model.

3. The method of claim 1, wherein the classification model is comprised of a malware classification model for cybersecurity threat detection.

4. The method of claim 3, wherein the scored probability comprises a probability of maliciousness as determined by the prior generation of malware classification model.

5. The method of claim 1, wherein the assigned weight varies according to the following relationship:

$$w_i = \alpha - \beta |\delta - P_{old}(X_i)|$$

where $w_i$ is the weight applied for a given item $X_i$ in the second dataset, $\alpha$ and $\beta$ are adjustable hyperparameters, $\delta$ is a parameter between 0.0 and 1.0 relating to the classification threshold, $P_{old}(X_i)$ is the numeric probability provided by the prior generation of the classification model for an incorrect classification of the given item $X_i$ in the second dataset, and "||" is an absolute value operator.

6. The method of claim 5, wherein hyperparameters $\alpha$ and $\beta$ are selected so as to reduce the resulting weight $w_i$ as the numeric probability $P_{old}(X_i)$ moves farther from the classification boundary.

7. The method of claim 1, wherein the weighting of the at least some of the labelled data in the second dataset includes lowering the weighting of at least some of the labelled data of the second dataset that yielded an incorrect classification.

8. The method of claim 1, wherein an ensemble of multiple generations is used for scoring.

9. The method of claim 8, wherein in assigning a weight, distances to decision boundaries for each such generation are computed and then combined to determine weight.

10. The method of claim 9, wherein in in assigning a weight, more importance is given to distances in more recent generations of classification models as compared to more remote generations of classification models.

11. The method of claim 1, wherein the second dataset of labelled data includes at least some of the labelled data in the first dataset together with labelled data not included in the first dataset.

12. A method for training a classification model, the method comprising:
    scoring a second dataset of labelled data on a prior generation of a classification model, wherein the prior generation was trained on a first dataset of labelled data;
    training a subsequent generation of a classification model with the second dataset of labelled data,
    wherein in training of the subsequent generation, weighting of at least some of the labelled data in the second dataset is adjusted based on the score of such labelled data in the prior generation; and
    providing the subsequent generation of a classification model as an update for a machine learning system.

13. The method of claim 12, wherein in training of the subsequent generation, the weighting of labelled data for incorrect classifications for the prior generation varies in accordance with distance of the incorrect classification from a classification boundary that defines a boundary between first and second classifications for the prior generation, such that the weighting decreases in accordance with increasing distance.

14. The method of claim 12, wherein scoring of the labelled data on the prior generation of the classification model provides a numeric probability that a given item of labelled data is a first classification, and
    wherein in training of the subsequent generation, the weighting of labelled data for incorrect classifications for the prior generation varies in accordance with a difference in the probability from a boundary, such that the weighting decreases in accordance with increasing distance from the boundary.

15. The method of claim 14, wherein the weighting varies according to the following relationship:

$$w_i = \alpha - \beta |\delta - P_{old}(X_i)|$$

where $w_i$ is the weight applied for a given item $X_i$ in the second dataset, $\alpha$ and $\beta$ are adjustable hyperparameters, $\delta$ is a parameter between 0.0 and 1.0 relating to the classification threshold, $P_{old}(X_i)$ is the numeric probability provided by the prior generation of the classification model for an incorrect classification of the given item $X_i$ in the second dataset, and "||" is an absolute value operator.

16. The method of claim 12, wherein the subsequent generation of the classification model comprises a generation immediately subsequent to the prior generation of the classification model.

17. The method of claim 12, wherein the subsequent generation of the classification model comprises a generation more remote from and not immediately subsequent to the prior generation of the classification model.

18. The method of claim 12, wherein in training of the subsequent generation, weighting of labelled data for incorrect classifications is reduced whereas weighting of correct classifications is not reduced.

19. The method of claim 12, wherein the second dataset of labelled data includes at least some of the labelled data in the first dataset together with labelled data not included in the first dataset.

* * * * *